United States Patent Office 2,712,003
Patented June 28, 1955

2,712,003

MANUFACTURE OF WATER-SOLUBLE HETEROPOLYMERS

Albert H. Bowen, Seattle, Wash., assignor to Monsanto Chemical Company, St. Louis, Mo., a corporation of Delaware No Drawing. Application November 23, 1949, Serial No. 129,179

6 Claims. (Cl. 260—72)

This invention relates to the production of water-soluble aldehyde cross-linked derivatives of resinous heteropolymers of a monovinyl compound with a member or members of the 4 to 6 carbon atom unsaturated dicarboxylic anhydrides, their acids, and suitable partial esters thereof, characterized by a non-Newtonian aqueous viscosity.

More specifically the invention relates to the production of a cross-linked resinous water-soluble reaction product of a polymerizable monovinyl compound-4 to 6 carbon atom unsaturated dicarboxylic acid heteropolymer containing at least one of the solubilizing radicals selected from the group consisting of —OH, —ONa, —OK, —OLi, —ONH$_4$, —NH$_2$, —NRH wherein R is an alkyl radical of one to 4 carbon atoms, and morpholinyl, such that the sum of the equivalents of said solubilizing radicals shall be at least substantially one per mole of heteropolymer unit, and containing at least one of the solubilizing and active hydrogen providing nitrogen containing radicals selected from the group consisting of —ONH$_4$, —NH$_2$, and —NRH wherein R is an alkyl radical of one to 4 carbon atoms, such that the sum of the equivalents of said nitrogen containing radicals shall be at least 0.05 per mol of heteropolymer unit, and an aldehyde from the group consisting of formaldehyde, ethanal, propanal, and furfural, characterized by a non-Newtonian aqueous viscosity.

The principal object of the invention is the production of the partially cross-linked water-soluble nitrogen derivatives of styrene-maleic anhydride and related resins to yield a new and useful product, wherein the cross-linking agent employed is formaldehyde.

Another object is to produce a non-Newtonian type viscosity product by cross-linking styrene-ammonium maleate with formaldehyde.

Other objects will be apparent from the following disclosure.

The class of resinous heteropolymers produced by co-polymerization from materials designated as monovinyl compounds (suitable monomers being vinyl halides, vinyl esters, vinyl ethers, acrylic acid and its esters, styrene, or the like, for example, vinyl chloride, vinyl acetate, vinyl ethel ether, etc.) and members of the 4 to 6 carbon atom unsaturated dicarboxylic acids (for example, maleic, ethyl maleic, fumaric, citraconic, mesaconic, itaconic acids) or their anhydrides (for example, maleic, citraconic, itaconic anhydrides) is well known. This class of heteropolymers is also sometimes referred to as "styrene-maleic anhydride heteropolymer type" resins. The partial esters of this type of heteropolymer are also disclosed in the prior art.

Resinous heteropolymers of the above indicated class may be produced by mass polymerization wherein the monomers are directly reacted together, solvent-non-solvent polymerization wherein the monomers are soluble in a solvent and are reacted therein but the heteropolymer is not soluble and is therefore precipitated out, and solvent polymerization wherein both the monomers and the heteropolymer are soluble in the solvent. Currently the solvent-non-solvent polymerization process wherein the monomers are in the mol ratio of substantially 1:1 is preferred.

The nitrogen derivatives, of the "dry process" disclosed and claimed by A. H. Bowen in Serial Number 64,044, filed December 7, 1948, now U. S. Patent No. 2,607,762, containing at least one active hydrogen atom to provide a reaction point to form the cross-linked methylene bridge, are adaptable to yielding the new product by cross-linking with formaldehyde or other aldehydes, but similar heteropolymer derivatives produced by other methods may also be employed. The dry process may be briefly described as a process wherein the styrene-maleic anhydride type heteropolymer is treated with substantially a mol equivalent of water per mol of heteropolymer unit and a water-soluble, basic, soluble salt-forming constituent. This procedure is designated as a dry process in spite of the use of water, since the quantity of water introduced primarily enters the reaction rather than also acting merely as a solvent or suspension medium, directly resulting in a substantially dry, water-soluble product without requiring any drying step.

Other aldehydes than formaldehyde may be employed, as for example, ethanal, propanal, furfural, etc., but formaldehyde is preferred due to its commercial abundance, economy, and desirable physical properties.

The suitable heteropolymers may be exemplified by using a diagrammatic structural formula of the styrene-maleic anhydride heteropolymer unit, it being understood that the aforementioned heteropolymers are to be considered as equivalent to styrene-maleic anhydride and may therefore be used in its place:

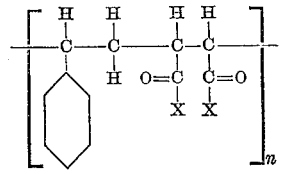

where the subscript $n$ represents the number of chain units in the heteropolymer molecule and where X may be a solubilizing radical such as —OH, —ONa, —OK, —OLi, —ONH$_4$, —NH$_2$, —NRH wherein R is an alkyl radical of one to 4 carbon atoms, and morpholinyl; however, in order to provide sufficient points for cross-linking with the aldehyde at least one X in forty and preferably at least about one X in ten must be selected from the radicals consisting of —ONH$_4$, —NH$_2$, and —NRH wherein R is an alkyl radical of one to 4 carbon atoms. It should be understood that the heteropolymer units need not be identical, for example, several of the above radicals may be used in the same heteropolymer so long as an adequate number of active hydrogen providing radicals are provided to enable cross-linking with the aldehyde to take place. Also a minor fraction of the X radicals may contain modifying radicals such as —NR$_2$, —OR' wherein R' is an alkyl radical of one to 8 carbon atoms, etc. which may add desirable characteristics so long as their effect is not allowed to overbalance the effect of the solubilizing radicals. Similarly the aforementioned —NRH radical wherein R is an alkyl radical of one to 4 carbon atoms may also contain other solubilizing radicals in the amine, as for example, the presence of a hydroxyl radical in hexanolamine in which case a larger carbon atom radical may generally be employed.

In general the aforementioned solubilizing radicals may be used singly or together but approximately at least the equivalent sum of one radical is required per heteropolymer unit in order to obtain proper water solubility. A maximum of two radicals may be incorporated per heteropolymer unit but an excess of the solubilizing radical providing material may often be used without detrimental effects. Thus it is seen that the heteropolymer may be a combination of various modifying radicals depending on the property desired. For example, the styrene-ammonium maleate may lose ammonia when applied in a thin film in a coating composition and the film thus develops a degree of water resistance whereas a non-volatile radical derivative, such as styrene-sodium maleate would maintain a constant solubility.

It will be seen that the —$ONH_4$, —$NH_2$, and —$NRH$ radicals serve a dual purpose in that they are solubilizing radicals as well as active hydrogen providing radicals which serve as cross-linkage points. These radicals may also be used in combination, but as pointed out above, it is required that at least one in forty and preferably at least one in ten of the total possible modifying radicals be selected from the above group. Thus the sum of the above group equivalents must be at least 0.05 mol per mol of heteropolymer unit.

The aforementioned dry process for the production of styrene-ammonium maleate may be modified by the treatment of a cross-linking agent, such as formaldehyde to produce a water-soluble product with a varying gel character depending on the quantity of formaldehyde used. This gel property is of particular value in paint formulations as it prevents pigment settling, decreases absorption by porous surfaces and prevents sagging of the wet paint when applied to a vertical surface. The quantity of formaldehyde used will, of course, determine the properties of the product. Other factors being held constant, an increase of formaldehyde increases the gel character of the heteropolymer and reduces its solubility due to the increased cross-linking with the resultant increase in molecular size.

The formaldehyde may be added either before or after the addition of the active hydrogen providing material, such as ammonia. However, it is found that the addition of formaldehyde to an ammoniated styrene-maleic anhydride resin initially gives much higher viscosities than when the formaldehyde is added prior to ammoniation. It is theorized that when an ammoniated heteropolymer, which has preferably been aerated to remove excess ammonia, is treated with formaldehyde, substantially all of the formaldehyde is available to cause cross-linking to occur, resulting in an increased viscosity product per mol of formaldehyde employed; whereas, when the styrene-maleic anhydride is treated with formaldehyde prior to ammoniation, the subsequent ammoniation also occasions the formation of hexamethylenetetramine which, of course, reduces the quantity of formaldehyde available for cross-linking, thereby producing a lesser increase in viscosity for the same quantity of formaldehyde employed in the previous procedure. Actually, it is somewhat surprising that any appreciable amount of cross-linking does occur in the latter case since aqueous formaldehyde and ammonia are regarded to react rapidly and quantitatively at ordinary temperatures. However, it has been found that in an aqueous suspension of hexamethylenetetramine and heteropolymer the hexamethylenetetramine may be broken down by heat to disperse the styrene-maleic anhydride, forming a very clear gel. Thus, the formaldehyde in the hexamethylenetetramine may again become available but the resinous product is not so susceptible to control as when ammoniated first. Also, the heat of reaction of the ammonia with the styrene-maleic anhydride may cause some of the previously formed hexamethylenetetramine to sublime. These factors, therefore, may tend to result in a non-uniform product and it is thus preferred that the styrene-maleic anhydride type heteropolymer be ammoniated first with subsequent cross-linking with formaldehyde.

It has been found that from 0.05 to 0.2 mol of formaldehyde per mol of styrene-maleic anhydride produces a desirable product for use in dry powder paints. However, it is readily seen that larger mol proportions of formaldehyde may readily be used by this process where a higher viscosity product is desired. It is to be pointed out that heteropolymer derivatives, manufactured by reacting the heteropolymer with a primary amine by the dry process, are also susceptible to cross-linking with formaldehyde as are amides formed by reacting anhydrous ammonia with the dry heteropolymer.

The following examples are directed primarily to styrene-maleic anhydride which at this time appears to be one of the more economic resins of this class. However, it is readily seen that other similar resins, for example, vinyl acetate-maleic anhydride, styrene-itaconic anhydride, etc., may also be treated in a similar manner.

It is apparent that many variations of the procedures herein disclosed for the purpose of illustration may be employed without departing from the spirit of the invention, thus it is not intended that the following examples should in any way limit the working of the invention.

Example 1

Monoethylamine was reacted with styrene-maleic anhydride in the presence of water in the following manner: 18 grams of water were ball-milled with 202 grams of styrene-maleic anhydride for 30 minutes, after which gaseous monoethylamine was introduced under pressure while ball-milling for an additional 30 minutes. During this time, the reactor became very hot. A fine, dry, free-flowing, white product was obtained and aerated to remove excess unreacted monoethylamine. Approximately 1.5 mols of monoethylamine were calculated to react with one mol of styrene-maleic anhydride, thus the approximate heteropolymer unit mol weight is 288. Ten parts of the product dissolved readily in 90 parts of water, yielding a substantially Newtonian liquid.

Two hundred grams of the above product were reintroduced into the ball-mill, 10 grams of 37 percent formaldehyde added thereto, and the ball-mill sealed. After running the ball-mill for about 15 minutes the cross-linked heteropolymer product was removed. The product was found to disperse in water yielding a non-Newtonian liquid.

It may be calculated that the 3.7 grams of formaldehyde employed in the above experiment amount to approximately 0.18 mol of formaldehyde per mol of heteropolymer unit.

Example 2

To 454 grams of previously ammoniated styrene-maleic anhydride in a ball-mill were added 20.4 grams of 37 percent formaldehyde, 8 grams of water and 24.4 grams of pine oil. (The pine oil was added to reduce dusting and more rapidly release entrapped air when the product is put into solution. However, the pine oil and water are not essential.) The mill was closed and run for a short time, then discharged. A 15 percent aqueous solution of the product was found to produce a solid gel. This cross-linked heteropolymer may be used in various applications as a thickener.

When mixed with a non-cross-linked styrene-ammonium maleate to the extent of about 5 percent and 10 percent, the viscosity of the mixture was about 60,000 gram-seconds and 125,000 gram-seconds respectively, whereas the original non-cross-linked styrene-ammonium maleate had a comparable viscosity of about 40,000 gram-seconds.

It may readily be calculated that the 7.5 grams of formaldehyde in this example amount to approximately 0.13 mol formaldehyde per mol of the styrene-maleic anhydride heteropolymer unit using an average molecular weight of 244 for the mixed styrene-ammonium maleate heteropolymer unit. As indicated previously, the quantity of formaldehyde employed is dependent on the desired end result and may be varied over wide limits. Also, the formaldehyde may be added prior to ammoniation but this alternative is less desirable than the procedure given above.

Example 3

A particularly advantageous continuous process was devised for the production of the ammonium salts of styrene-maleic anhydride type resins. It was found that, by spreading approximately a ⅛ inch layer of powdered styrene-maleic anhydride resin onto a porous belt under which steam was introduced, from 8 percent to 15 percent moisture may be taken up by the powder within a period of about 2 minutes. The wetted powder was found not to lump or cling to the belt even at moisture contents as high as 22 percent. The moisture content of the powder may be varied by the rate of steam introduction and/or rate of belt travel. In either case, the rate of water uptake may be readily controlled by the installation of a dielectric type moisture meter at the outlet of the hydration chamber, thus enabling constant and rapid determination of the moisture content of the resin powder with subsequent alteration of operating conditions to maintain the moisture content within the optimum range.

The moistened powder was discharged from the belt into a screw conveyor type reactor in which the powder was agitated as it was moved forward countercurrent to a flow of gaseous ammonia which entered the reactor near the product discharge port. There resulted a water-soluble ammonium salt of styrene-maleic anhydride.

The wetted styrene-maleic anhydride may also be introduced through a barrel valve or its equivalent to a reaction chamber wherein the moist styrene-maleic anhydride is spread in a relatively thin film onto a traveling belt. The reaction chamber is maintained at a high ammonia partial pressure. The volatilization of excess water from the moist styrene-maleic anhydride due to the exothermic heat of reaction is controlled by continuously circulating the ammonia gas and removing the water contained therein by condensation or other suitable methods. The water-soluble styrene-ammonium maleate is then discharged through a second barrel valve to a second similar reaction chamber where the styrene-ammonium maleate may be reacted with gaseous formaldehyde, the time of exposure and concentration of formaldehyde being controlled to obtain the desired product. The heteropolymer primary amine or amide derivatives may be similarly reacted with formaldehyde.

In general, the term "styrene-ammonium maleate" is often loosely used to designate the mixed product formed by the dry process reaction of ammonia with the heteropolymer. The product may contain mixed mono- and di-ammonium salts as well as a minor fraction of the half amide. Similarly, other heteropolymer derivatives are often designated in an analogous manner.

The term "water-soluble" is used in this specification in its broader sense which includes water-dispersible. Thus a solubilized, cross-linked heteropolymer capable of forming a homogeneous system with water is considered to be water-soluble.

The various water-soluble cross-linked derivatives of the heteropolymers hereinbefore disclosed may be variously used as excellent non-yellowing finishes for textiles, thickening agents, emulsifying agents, stabilizers, or protective colloids in emulsion paints, film formers, adhesives (for example, as pigment binders for paper coating, binders in water-dispersible dry powder paints, adhesive base for rewettable gummed tape, etc.), sizing agents, shrinkage control agents, tanning agents, waterproofing agents, etc.

The methods and processes described above have been selected only by way of being illustrative of the invention, thus it should be understood that the invention is not limited to these precise methods, processes, and products, but changes may be made therein without departing from the scope of the invention.

I claim:

1. The process of directly preparing water-soluble polymers comprising the condensation reaction at about room temperature, while the reaction mass is being well agitated, of a substantially dry, powdered styrene-maleic anhydride heteropolymer containing a solubilizing radical selected from the group consisting of —OH, —ONa, —OK, —OLi, —ONH$_4$, —NH$_2$, —NRH wherein R is an alkyl radical of one to 4 carbon atoms, and morpholinyl, such that the sum of the equivalents of said solubilizing radicals is at least substantially one per mol of heteropolymer unit, and containing solubilizing and active hydrogen providing nitrogen-containing radicals selected from the group consisting of —ONH$_4$, —NH$_2$, and —NRH wherein R is an alkyl radical of one to 4 carbon atoms, such that the sum of the equivalents of said nitrogen-containing radicals is at least 0.05 per mol of heteropolymer unit with from about 0.05 to about 0.2 mol per heteropolymer unit of an aldehyde from the group consisting of formaldehyde, ethanal, propanal, and furfural, which reaction product is characterized as a dry, powdered, free-flowing, water-soluble polymer, the aqueous dispersion of which has a non-Newtonian viscosity.

2. The process of directly preparing water-soluble polymers comprising the condensation at about room temperature, while the reaction mass is being well agitated, of substantially dry, powdered styrene-ammonium maleate heteropolymers, wherein the said heteropolymer consists of substantially equimolecular amounts of styrene and ammonium maleate and the ammonium radical is present to the extent of at least substantially one mol per mol of heteropolymer unit, with from about 0.05 to about 0.2 mol of formaldehyde, per mol of heteropolymer unit, which reaction product is characterized as a dry, powdered, free-flowing, water-soluble polymer, the aqueous disperson of which has a non-Newtonian viscosity.

3. The process of directly preparing water-soluble polymers comprising the condensation at about room temperature, while the reaction mass is being well agitated, of a substantially dry, powdered styrene-maleic anhydride heteropolymer solubilized with an aliphatic primary amine, wherein the alkyl radical of said amine contains from one to 4 carbon atoms, present in a ratio of at least substantially one mol of said amine per mol of heteropolymer unit with from about 0.05 to about 0.2 mol of formaldehyde per heteropolymer unit, which reaction product is characterized as a dry, powdered, free-flowing, water-soluble polymer, the aqueous dispersion of which has a non-Newtonian viscosity.

4. The process of directly preparing water-soluble polymers comprising the condensation at about room temperature, while the reaction mass is being well agitated, of a substantially dry, powdered styrene-maleic anhydride heteropolymer containing from about 0.05 to about 0.2 mol of —ONH$_4$, and —ONa in an amount sufficient to provide at least the sum of one mol equivalent of the solubilizing and nitrogen-containing radicals with from about 0.05 to about 0.2 mol of formaldehyde, all per mol of heteropolymer unit, which reaction product is characterized as a dry, powdered, free-flowing, water-soluble polymer, the aqueous dispersion of which has a non-Newtonian viscosity.

5. The process of directly preparing water-soluble polymers comprising the condensation at about room temperature, while the reaction mass is being well agitated, of a substantially dry, powdered styrene-maleic anhydride heteropolymer containing from about 0.05 to about 0.2 mol of —NRH, wherein R is an alkyl radical of one to 4 carbon atoms, and —ONa in an amount sufficient to provide at least the sum of one mol equivalent of the solubilizing and nitrogen-containing radicals with from about 0.05 to about 0.2 mol of formaldehyde, all per mol of heteropolymer unit, which reaction product is characterized as a dry, powdered, free-flowing, water-soluble polymer, the aqueous dispersion of which has a non-Newtonian viscosity.

6. The process of directly preparing water-soluble polymers comprising the condensation at about room temperature, while the reaction mass is being well agitated, of a substantially dry, powdered styrene-maleic anhydride heteropolymer containing from about 0.05 to about 0.2 mol of —$NH_2$, and —ONa in an amount sufficient to provide at least the sum of one mol equivalent of the solubilizing and nitrogen-containing radicals with from about 0.05 to about 0.2 mol of formaldehyde, all per mol of heteropolymer unit, which reaction product is characterized as a dry, powdered, free-flowing, water-soluble polymer, the aqueous dispersion of which has a non-Newtonian viscosity.

References Cited in the file of this patent

UNITED STATES PATENTS

| | | |
|---|---|---|
| 2,146,209 | Graves | Feb. 7, 1939 |
| 2,173,005 | Strain | Sept. 12, 1939 |
| 2,469,409 | Powers | May 10, 1949 |
| 2,504,003 | Cupery | Apr. 11, 1950 |

FOREIGN PATENTS

| | | |
|---|---|---|
| 937,469 | France | Mar. 8, 1948 |